Aug. 17, 1926.

R. FISCHBACH 1,596,168

VALVE

Filed June 30, 1925

Inventor:
RICHARD FISCHBACH
By
His Attorney.

Patented Aug. 17, 1926.

1,596,163

UNITED STATES PATENT OFFICE.

RICHARD FISCHBACH, OF BERLIN, GERMANY.

VALVE.

Application filed June 30, 1925, Serial No. 40,622, and in Germany October 13, 1924.

The constant increase of the steam pressure in modern steam plants has led to the employment of correspondingly decreasing diameters of the tubes for a given output of the plant. In attempting to design a valve of the type described, for instance, in my U. S. patent applications 498,516 and 690,032, which had originally been designed for tubes having a diameter of average value, for the use with tubes of a diameter which is essentially smaller such as are used in high-pressure steam plants, I have found that by employing the obvious principle of proportionally decreasing the dimensions of the valve, there will be the result, that for important parts of the valve dimensions will be obtained which are impermissible in practice.

In order to design a high-pressure valve for small tube diameters according to my invention, I exchange the kinematic functions of certain operating members of the valve and more particularly of the spindle and the nuts or pressure members co-operating therewith, which form part of the type of valve described in my above-mentioned patent applications.

According to my present invention the members, which carry the female thread for receiving the pressure spindle, are mounted externally of the valve discs in such a manner that they may be rotated around their axis, while being prevented against motion in their axial direction. These pressure members are connected to the valve discs only by means of the pressure spindle. The spindle $a$ which is non-rotatable and displaceable in axial direction, is mounted in the non-rotatable but axially displaceable main valve discs, and carries at both of its ends the balanced closing members of the valve which are of conical conformation.

Figure 1:
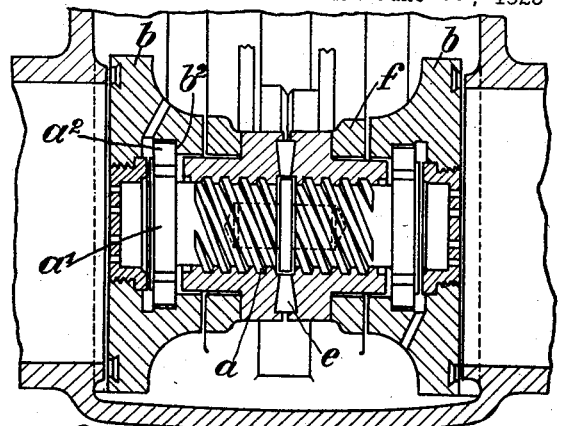
Figure 3:
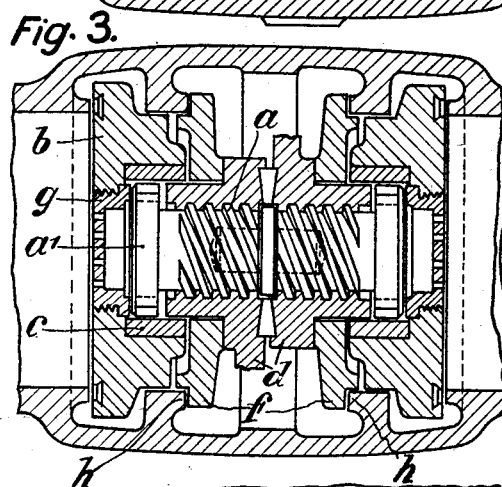
Figure 4:
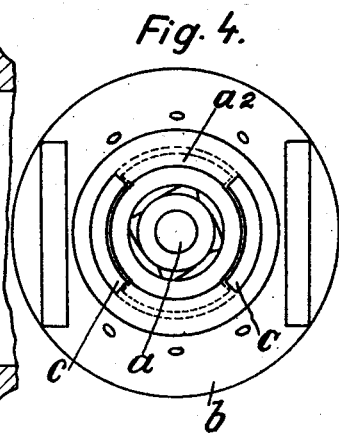
Figure 2:
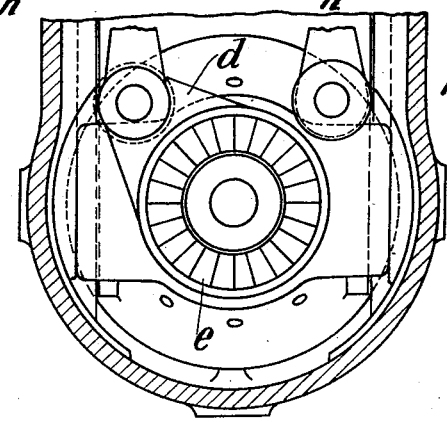

In the drawing I have represented an example of the high-pressure valve constructed according to my present invention, Fig. 1 showing the essential parts of the valve in a vertical section, Fig. 2 being a vertical cross-section through the center plane of Fig. 1, Fig. 3 representing a horizontal section through the center plane of Fig. 1, and Fig. 4 showing the closing member in the form of a plate with the balancing or equalizing member inserted thereinto.

The pressure spindle $a$ is rigidly connected at its rear and front ends with the balancing members $a^1$. These members $a^1$ carry projecting flanges $a^2$ as shown in Figs. 1 and 4. The flanges $a^2$ in the open position of the valve, as shown, will be pressed against the rim $b^2$ of the main valve disc $b$. In order that the equalizing member $a^1$ together with its flanges $a^2$ may be introduced into the main valve disc $b$, recesses are provided at the rim $b^2$ of said main valve plate $b$, said recesses being of a configuration similar to that of said flanges $a^2$. After having introduced the equalizing member $a^1$ and after a rotation of the same by an angle of 90 degrees against the main valve disc $b$, the said recesses will be closed up by the projections $c$. The dimensions of the several parts are so chosen, that the flanges $a^2$ will rest with a small clearance within said projections $c$. By rotating the pressure nuts $d$ which are provided with cranks serving for actuating the pressure spindle in the one or other sense of rotation, the flanges $a^2$ will abut with one of its radially positioned faces against the corresponding face of the projections $c$. By this the pressure spindle $a$ will be prevented from participating in the rotary motion. Each of the main valve discs $b$ contains a valve seat $g$ in the well known manner. This valve seat $g$ is provided with properly formed recesses serving for the reception of the equalizing member $a^1$. Interposed between the two cranks $d$ carrying the female thread for the pressure spindle $a$ there is a pressure bearing, as indicated at $e$ in Figs. 1 and 2, similar to the pressure bearing used in the construction according to the above mentioned patent application 498,516. In axial direction the two cranks $d$ are held together by two pressure plates $f, f$, which are guided by means of the two ledges $h, h$, firmly connected to the valve casing, as shown in Fig. 3. The pressure nuts $d$ of the pressure spindles $a$ are rotatably mounted within these pressure plates $f, f$. The pressure nuts $d$ will thus actuate the valve spindle in axial direction of the same in order to open the passage of the valve.

In all other respects the mode of operation of the new valve according to my present invention is exactly the same as that of the valve according to my U. S. patent application 498,516.

By exchanging the kinematic functions of the pressure spindle and their actuating member in pressure valves having a passage of small diameter, the essential advantage is obtained, that the two-part pressure spindle will no more need to be held together by a bolt. By this the useful cross-section of the pressure spindle will be essentially increased. In addition to this there are other constructional advantages, which enable the valve according to my above two applications for patent to be adapted for smaller tube diameters, as above pointed out.

I claim:

1. A high pressure steam valve comprising a casing having valve seats, a pair of valve discs cooperating with said seats, a pair of pressure spindles, one of which is situated in each of said valve discs and non-rotatable but axially displaceable relatively thereto, a balancing member interposed between each of said pressure spindles and one of said valve discs, pressure nuts for actuating said pressure spindles to move said spindles oppositely and in axial direction, and actuating means for said pressure nuts.

2. A valve as claimed in claim 1 having each of the balancing members provided with projecting flanges and each of the valve discs provided with recesses cooperating with said flanges, and additional projecting members filling a space left between the valve discs and the balancing members after introduction of the latter into the valve, said additional projecting members being adapted to prevent rotation of the balancing members and spindles relatively to the valve discs.

3. A valve according to claim 1 having the pressure nuts crank-shaped, said nuts cooperating with said pressure spindles to move the latter in axial direction relatively to each other upon opposite rotation of said nuts, a pressure bearing interposed between said pressure nuts, pressure plates for holding said pressure nuts together, and ledges provided on the casing, said ledges forming a guide for said pressure plates.

In testimony whereof I have affixed my signature.

RICHARD FISCHBACH.